United States Patent
Mingant et al.

(10) Patent No.: US 10,938,055 B2
(45) Date of Patent: Mar. 2, 2021

(54) REDOX FLOW BATTERY INCLUDING A SYSTEM FOR DECREASING BY-PASS CURRENTS

(71) Applicant: IFP Energies nouvelles, Rueil-Malmaison (FR)

(72) Inventors: Remy Mingant, Vienne (FR); Gerard Bureau Du Colombier, Caluire et Cuire (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 136 days.

(21) Appl. No.: 16/343,581

(22) PCT Filed: Oct. 3, 2017

(86) PCT No.: PCT/EP2017/075062
§ 371 (c)(1),
(2) Date: Apr. 19, 2019

(87) PCT Pub. No.: WO2018/072991
PCT Pub. Date: Apr. 26, 2018

(65) Prior Publication Data
US 2019/0252709 A1 Aug. 15, 2019

(30) Foreign Application Priority Data
Oct. 19, 2016 (FR) ...................... 1660109

(51) Int. Cl.
*H01M 2/36* (2006.01)
*H01M 8/20* (2006.01)
(Continued)

(52) U.S. Cl.
CPC ......... *H01M 8/20* (2013.01); *H01M 8/04955* (2013.01); *H01M 8/188* (2013.01); *H01M 8/24* (2013.01); *Y02E 60/50* (2013.01)

(58) Field of Classification Search
CPC .... H01M 8/20; H01M 8/04955; H01M 8/188; H01M 8/24; Y02E 60/50
See application file for complete search history.

(56) References Cited

U.S. PATENT DOCUMENTS 6,338,787 B1 * 1/2002 Obata .................... C23C 18/34
205/101
8,877,365 B2 * 11/2014 Keshavarz .......... H01M 4/8803
429/105
(Continued)

FOREIGN PATENT DOCUMENTS

JP       2003-100337 A    4/2003
KR       101 357 822 B1   2/2014
(Continued)

OTHER PUBLICATIONS

International Search Report for PCT/EP2017/075062, dated Nov. 7, 2017; English translation submitted herewith (5 pgs.).

Primary Examiner — Raymond Alejandro
(74) Attorney, Agent, or Firm — Fitch, Even, Tabin & Flannery, LLP (57) ABSTRACT

The invention is a redox flow battery (1000) comprising n electrochemical cells 300 that are electrically connected in series (300) with each cell including a cathode (310) and an anode (320) that are separated by a membrane (330) and that are respectively passed through by a catholyte and an anolyte originating from a catholyte tank (110) and an anolyte tank (120). The cells are fluidically connected in parallel. The invention is also a system for decreasing bi-pass currents including means (700) for injecting a gas into the inlet ducts (401) and outlet ducts (501) of the cathode and anode of (n−1) cells to form gas bubbles; and a device (800) for removing the gas bubbles, placed, on the inlet ducts of the cathode and anode of the (n−1) cells, (Continued)

downstream of the means for injecting the gas and upstream of the cathode and anode of the cells.

19 Claims, 3 Drawing Sheets

(51) Int. Cl.
*H01M 8/18* (2006.01)
*H01M 8/24* (2016.01)
*H01M 8/04955* (2016.01)

(56) References Cited

U.S. PATENT DOCUMENTS

| | | |
|---|---|---|
| 9,692,061 B2 * | 6/2017 | Oh .......................... H01M 8/20 |
| 2012/0308856 A1 | 12/2012 | Horne et al. |
| 2014/0057141 A1 | 2/2014 | Mosso et al. |
| 2015/0180074 A1 | 6/2015 | Jin et al. |

FOREIGN PATENT DOCUMENTS

| | | |
|---|---|---|
| WO | 2007/131250 A1 | 11/2007 |
| WO | 2012/078786 A2 | 6/2012 |
| WO | 2014/035020 A1 | 3/2014 |
| WO | 2014/145844 A1 | 9/2014 |

* cited by examiner

REDOX FLOW BATTERY INCLUDING A SYSTEM FOR DECREASING BY-PASS CURRENTS

CROSS REFERENCE TO RELATED APPLICATIONS

Reference is made to PCT/EP2017/075062 filed Oct. 3, 2017, and French Application No. 16/60.109 filed Oct. 19, 2016, which are incorporated herein by reference in their entirety.

BACKGROUND OF THE INVENTION

Field of the Invention

The present invention relates to redox flow systems in batteries for storing and releasing electrochemical energy, in particular to the reduction or elimination of shunt currents in such batteries.

Description of the Prior Art

Redox flow batteries, also referred to as flow batteries, are rechargeable batteries in which reactants in liquid form, an oxidizing agent and a reducing agent, are circulated from two storage tanks and react in a cell comprising two electrodes separated by an ion-permeable membrane. The reactants in liquid form are redox compounds, which are reduced at the positive electrode of the cell and which are oxidized at the negative electrode when the system discharges. The battery then operates as a generator. Conventionally, reference is made to the catholyte to denote an electrolyte containing specific redox ions that are in an oxidized state and undergo reduction at the positive electrode (cathode) during the discharging of the battery. Reference is also made to an anolyte to denote the electrolyte containing specific redox ions that are in a reduced state and undergo oxidation at the negative electrode (anode) during the discharging of the battery. These redox reactions are reversed during the charging of the battery and then the system is operating as an electrolyzer. Redox flow batteries thus meet the definition of a rechargeable battery, which is a rechargeable electrochemical generator, which is a system that converts the chemical energy contained in the active materials that directly provide electrical energy from oxidation-reduction reactions (redox reactions), and in which the redox reactions are reversible, for example by connecting an electrical power supply to its terminals creating a reverse current to the discharge direction.

It is noted that in conventional redox flow batteries, the catholyte and anolyte are active solutions in which the redox reactions take place in the liquid state with soluble redox couples, unlike what is understood by an electrolyte in a conventional battery (rechargeable battery or "secondary battery"), which is a solution that acts simply as transport media for charges in ionic form between the two electrodes in order to ensure the overall electroneutrality of the system, but which does not store energy.

Studies on redox flow batteries really began in the 1970s, with in particular the arrival of the zinc/chlorine system. Currently, the most widely known redox flow batteries are vanadium redox batteries (VRB), which are commercialized systems, and zinc/bromine (Zn/Br) redox flow batteries, which have the distinctive feature of having one of the reactants in solid form deposited at an electrode.

Redox flow batteries have a considerable advantage of exhibiting a charging/discharging capacity which may be very large, since it is a function of the size of the catholyte and anolyte tanks used. Moreover, the electrolytes/electrochemical cell separation enables a decoupling between the available power, linked to the sizing of the electrochemical cell, and the energy capacity of the system, linked to the size of the electrolyte tanks.

Redox flow batteries can be used in stationary storage applications for electrical energy, for example photovoltaic systems or electricity-generating wind power systems that have a need to store and release energy linked to the intermittency of the energy production. Redox flow batteries also constitute an advantageous option for other stationary storage applications such as the storage of the surplus electrical energy in nuclear and thermal power plants.

In stationary applications, high voltage levels and high capacities are generally required, and redox flow batteries are then conventionally formed from a plurality of cells electrically connected in series, with an electrolyte that passes through each of the cells via a parallel pathway.

In this configuration of cells connected in series and fluidically connected in parallel, one of the major problems encountered is the appearance of bypass currents, also referred to as parallel currents, and better known as shunt currents, which are currents that are detrimental to the proper operation of the redox flow battery. In particular, shunt currents constitute one of the main factors that adversely affects the performance of redox flow batteries, by reducing the cycle lifetime of the battery, and also the energy efficiency of the battery.

Specifically, shunt currents are a form of short circuit caused by the electrically conductive path formed in the electrolyte bypassing the cells, resulting in a consumption of the available discharging energy or of the delivered charging energy. These losses by shunt currents, that may occur during charging, discharging and even in open circuit, have undesirable secondary effects, such as corrosion of the electrodes and/or of other components, unnecessary stressing of the reactants, excessive heat losses, leading to the loss of usable energy and to the shortening of the useful lifetime of the battery.

It is thus desirable to limit the shunt currents in order to reduce these negative impacts to a minimum.

Various known systems propose reducing shunt currents in redox flow batteries.

Known techniques for reducing shunt currents lengthen the passage of the electrolyte, for example within the electrochemical cell, as described in patent application WO 2014/035020 A1, or upstream and downstream of the electrochemical cell, as described in patent application WO 2014/145844 A1. Such techniques based on an increase in the length of the pipe for circulating the electrolyte have the main drawback of a reduction in the electrolyte flow cross section, which leads to a pressure drop and an increase in the electrolyte flow resistance having repercussions on the pumping, ultimately penalizing the energy efficiency of the redox flow battery.

US published application 2012/0308856 A1 discloses a redox flow battery comprising shunt current active resistor devices positioned in the fluidic pathway at the inlet and the outlet of the cells. Various devices are proposed, such as components comprising a fluid inlet and a fluid outlet, and a mechanical part having solid balls, making it possible to make the fluid flow rate not only intermittent, but also mechanically disconnected from any electrolytic contact between the inlet and the outlet.

A system is also known, as described in patent application WO 2007/131250 A1, in which the shunt currents are reduced by the passage of the electrolyte through another electrically nonconductive liquid phase having a density different from that of the electrolyte and immiscible with this electrolyte.

Japanese patent application JP 2003100337 A also discloses a system in which the electrolyte arrives at the cells intermittently, thus reducing the shunt currents by cutting the electrolytic connections between the cells.

Korean patent application KR 101357822 proposes another system for reducing shunt currents in which an intermittent supply of electrolyte to the cells is carried out, the system comprising valves at the inlet of the cells. The system may further use forming gas bubbles in the electrolyte entering the cells. Such a system, in addition to comprising a complex control of the circulation of the electrolyte involving valves and the control thereof, has the drawback of leading to a loss of power due to a reduction in the contact area between the electrode and the electrolyte which contains gas bubbles. Problems of power instability and of electrochemical noise may also occur in such batteries.

SUMMARY OF THE INVENTION

The present invention at least partly overcomes the drawbacks of the cited prior art, and generally reduces or even eliminates shunt currents in redox flow batteries.

In particular, the present invention provides a redox flow battery comprising a system for reducing, or even eliminating, shunt currents which is simple from a structural point of view, and which does not significantly affect the power of the battery.

Thus, in order to achieve at least one of the abovementioned objectives, amongst others, the present invention, according to a first aspect in a redox flow system for storing and releasing electrochemical energy, comprises n electrochemical cells electrically connected in series, n being an integer greater than or equal to 2, each cell comprising a chamber formed by a cathode compartment containing a catholyte and an anode compartment containing an anolyte, the cathode and anode compartments being separated by a separator that is electrically insulating and permeable to the ions contained in the catholyte and the anolyte, and the cathode and anode compartments each comprising an inlet duct and an outlet duct for the circulation respectively of the catholyte and of the anolyte in the compartments;

a first storage tank for the catholyte;

a second storage tank for the anolyte;

means for providing fluid communication between the first tank and the cathode compartment of each electrochemical cell and between the second tank and the anode compartment of each electrochemical cell, such that the electrochemical cells are fluidically connected in parallel;

a system for reducing shunt currents comprising:

means for injecting a gas into the inlet and outlet ducts of the cathode and anode compartments of (n−1) electrochemical cells in order to form gas bubbles in the inlet and outlet ducts;

a device for removing the gas bubbles which is positioned on the inlet ducts of the cathode and anode compartments of the (n−1) electrochemical cells, is positioned downstream of the means for injecting the gas and upstream of the cathode and anode compartments.

Advantageously, the gas is inert, and is preferably $N_2$.

Preferably, the largest dimension of the gas bubbles is greater than or equal to 1.5 times the diameter of the inlet and outlet ducts of the cathode and anode compartments of the (n−1) electrochemical cells.

According to one embodiment, the means for injecting the gas comprises, for each inlet duct and outlet duct of the cathode and anode compartments of the (n−1) electrochemical cells, a gas supply pipe connected to a tank of the gas, the pipe opening into the inlet duct or outlet duct of the cathode and anode compartments.

According to one embodiment, the means for injecting the gas comprises at least one fan or a gas compressor connected to the tank of the gas in order to maintain pressure in the tank.

The means for injecting the gas may comprise at least one valve positioned on the gas supply pipe, downstream of the gas tank.

Alternatively, the gas supply pipe has a flow area such that the gas is injected into the inlet ducts or outlet ducts of the cathode and anode compartments by the Venturi effect.

According to one embodiment, the device for removing the gas bubbles comprises a hermetic chamber comprising:

a liquid phase in a lower part of the chamber, the liquid phase comprising anolyte or catholyte;

a gas phase in an upper part of the chamber, the gas phase comprising gas of the same type as the gas injected to form the bubbles;

an outlet for the gas, preferably a relief valve, positioned at the top of the upper part of the chamber;

a first portion of the inlet duct, in which the catholyte or anolyte containing the gas added flows, opening into the upper part of the chamber, and a second portion of the inlet duct, in which the catholyte or anolyte with the gas removed flows, opening into the lower part of the chamber, the first portion of the inlet duct being located downstream of the means for injecting the gas into the inlet ducts of the cathode or anode compartments of the (n−1) electrochemical cells and the second portion of the inlet duct being located downstream of the device for removing the gas and upstream of the cathode or anode compartments of the (n−1) electrochemical cells.

According to one embodiment, the means for injecting a gas comprises a circuit for recycling the gas, removed by the device for removing the gas bubbles, to the outlet ducts of the cathode or anode compartments of the (n−1) electrochemical cells.

According to one embodiment, the means for fluid communication comprise:

a first main inlet duct and a first main outlet duct connecting the first tank to the cathode compartments of the n electrochemical cells, the first main inlet duct being configured to distribute the catholyte into the inlet ducts of the cathode compartments by a first pump and the first main outlet duct being to collect the catholyte from the outlet ducts of the cathode compartments;

a second main inlet duct and a second main outlet duct connecting the second tank to the anode compartments of the n electrochemical cells, the second main inlet duct distributing the anolyte into the inlet ducts of the anode compartments by means of a second pump and the second main outlet duct collecting the anolyte from the outlet ducts of the anode compartments of the n electrochemical cells.

According to one embodiment, the inlet and outlet ducts of the cathode and anode compartments of the n electrochemical cells, and the first and second main inlet and outlet ducts are electrically insulating.

The inlet and outlet ducts of the cathode and anode compartments of the n electrochemical cells, and the first and second main inlet and outlet ducts, may have one or more electrically insulating materials, preferably selected from electrically insulating thermoplastic polymers, preferably selected from PVC, polyethylene and polypropylene.

Alternatively, the inlet and outlet ducts of the cathode and anode compartments of the n electrochemical cells, and the first and second main inlet and outlet ducts, may have a body of one or more electrically conductive materials, and have an electrically insulating internal coating in contact with the catholyte or the anolyte, the internal coating preferably being an electrically insulating material selected from electrically insulating fluoropolymers, more preferentially selected from the list PTFE and PFA.

The present invention, according to a second aspect is a process for reducing shunt currents in a redox flow system for storing and releasing electrochemical energy according to the invention, comprising the steps of:

sending a catholyte and an anolyte respectively into cathode and anode compartments of n electrochemical cells electrically connected in series, n being an integer greater than or equal to 2, and fluidically connected in parallel, by pumping the catholyte and anolyte respectively from a first tank and a second tank;

injecting gas into the catholyte and anolyte inlet ducts of the cathode and anode compartments of (n−1) electrochemical cells to form gas bubbles in the inlet ducts;

removing the gas bubbles from the catholyte and anolyte before they enter the cathode and anode compartments of the (n−1) electrochemical cells;

injecting gas into the catholyte and anolyte outlet ducts of the cathode and anode compartments of (n−1) electrochemical cells to form gas bubbles in the outlet ducts;

sending the catholyte and the anolyte containing gas bubbles back respectively to the first tank and the second tank with the gas being separated from the catholyte and from the anolyte within the first and second tanks.

Other subjects and advantages of the invention will become apparent on reading the description which follows of specific exemplary embodiments of the invention, given by way of nonlimiting examples, the description being made with reference to the appended figures described below.

In the drawings, the same references denote identical or analogous elements.

DETAILED DESCRIPTION OF THE INVENTION

The invention provides a redox flow system for storing and releasing electrochemical energy comprising a system for reducing shunt currents.

In the present description, the expression "redox flow battery" will also be used to denote such a redox flow system for storing and releasing electrochemical energy.

Figure 1:
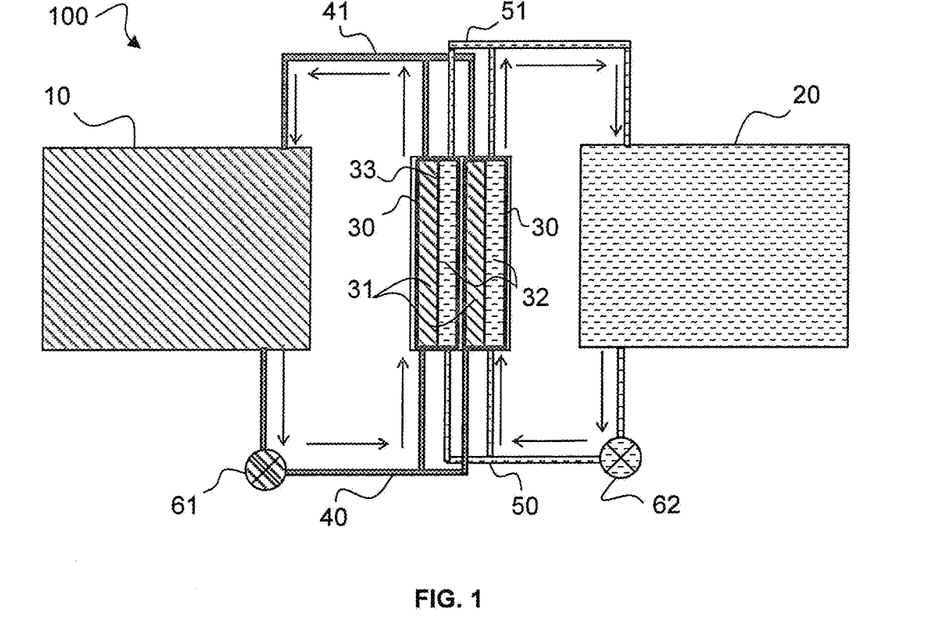
FIG. 1 is a schematic cross-sectional view of a redox flow battery according to the prior art.

Conventionally, a redox flow battery 100, as represented in FIG. 1, comprises a plurality of electrochemical cells 30 which are stacked and electrically connected, at least partly, in series. As in the case of rechargeable batteries, the cells mounted in series make it possible to obtain high voltages, which makes possible providing power suitable for a targeted application. Two such cells are represented in FIG. 1.

Each cell 30 comprises a chamber formed by a cathode compartment 31 containing a catholyte and an anode compartment 32 containing an anolyte. The cathode 31 and anode 32 compartments are separated by a separator 33 that is electrically insulating and permeable to the ions contained in the catholyte and the anolyte.

The cathode 31 and anode 32 compartments are each defined between the separator 33 and a current collector dedicated to each compartment (not represented). The current collectors are for example metal plates or plates formed of carbon, which themselves are not subjected to redox activity.

Each cathode 31 and anode 32 compartment comprises at one end an inlet for receiving a flow of electrolyte (catholyte or anolyte depending on the compartment) and at the other end an outlet for discharging the flow of electrolyte.

The cells 30 are fluidically connected in parallel with the catholyte flowing between a catholyte tank 10 and the cathode compartments 31 of the cells 30. A parallel distribution of the catholyte is carried out at branching of a main supply duct 40 of the catholyte. The cathode compartments are thus supplied by a network of parallel ducts attached to the main supply duct 40. The catholyte leaves the cathode compartments of the cells along other parallel ducts that join up with a main outlet duct 41 returning the catholyte to the tank 10. The layout is identical for the anolyte which flows between an anolyte tank 20 and the anode compartments 32 of the cells 30, and which is distributed from a main supply duct 50 supplying in parallel the inlet of the anode compartments, and which is recovered at the outlet of the anode compartments by a main outlet duct 51 connected to the second tank 20.

The tanks 10 and 20 are thus shared by the various cells 30.

The flow direction of the electrolytes is represented by the arrows.

In the represented battery, a single pump (61, 62) is used per type of electrolyte to circulate the electrolyte from the tank (10, 20) to the cells 30.

The distribution of the liquid in the cells is carried out so that the pressure drops are identical in each branch (each parallel duct) and so that the flows are identical.

The anode compartment is the reaction zone where an electrochemical oxidation reaction (emission of electrons) takes place, as opposed to the cathode compartment which is zone where an electrochemical reduction (absorption of electrons) takes place.

The anode compartment contains the negative electrode or anode, and the cathode compartment contains the positive electrode or cathode.

In a redox flow battery, which is a rechargeable battery, these roles switch depending on whether the system is discharging or charging since the redox reactions are reversible. Thus, the anode compartment, where an oxidation reaction takes place which enables the emission of electrons when the system flows (discharges), becomes the site of a reduction reaction if a current is applied to the system in order to recharge it.

Consequently, the expressions anode and cathode compartments are defined in the present description by taking, as reference, the discharge operating state of the system.

The catholyte denotes an electrolyte containing specific redox ions that are in an oxidized state and undergo reduction at the positive electrode (cathode) during the discharging of the battery. The anolyte denotes an electrolyte containing specific redox ions that are in a reduced state and undergo oxidation at the negative electrode (anode) during the discharging of the battery.

In FIG. 1, the system is represented as operating in the discharge direction. The electrons released at the anode of a cell are collected by the current collector of the anode and flow via an external electric circuit connected to the current collector of the cathode of the cell.

In a conventional redox flow battery, shunt currents which are damaging for the battery are created, as already explained above in the description.

In the redox flow battery 100, the continuous flow of liquid electrolyte creates an electrically conductive pathway. A potential difference is created in the electrolyte between the inlet and the outlet of the cell 30, owing to the electrochemical reactions taking place in the cell 30. A shunt current may then be created in the catholyte between the two branches of the ducts 40 and 41, which fluidically connect in parallel the cathode compartments of the cells to the tank 10. Similarly, a shunt current may be created between the two branches of the ducts 50 and 51, which fluidically connect in parallel the anode compartments of the cells to the tank 20.

The present invention provides a redox flow battery comprising a system for reducing shunt currents.

Figure 2:
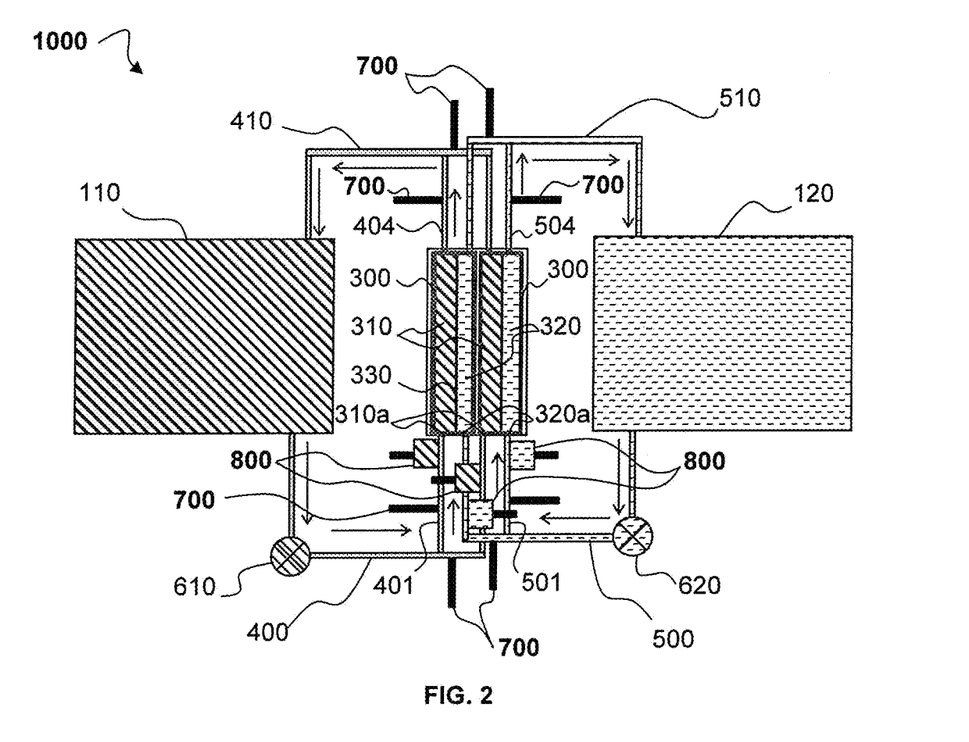
FIG. 2 is a schematic cross-sectional view of a redox flow battery according to a first embodiment of the invention.

FIG. 2 represents a redox flow system for storing and releasing electrochemical energy 1000 according to a first embodiment of the invention.

The system is represented as operating in the direction of a discharge and the flow direction of the electrolytes as illustrated by arrows, as for the conventional battery from FIG. 1.

The battery 1000 comprises n electrochemical cells electrically connected in series with n being an integer greater than or equal to 2. Typically, such a battery comprises between 2 and 60 cells, that may form a module. If the required voltage is greater, several modules of cells may be mounted in series. For example, a battery according to the invention may comprise 20 cells electrically connected in series, supplying for example a voltage of 24 V.

In FIG. 2, two cells 300 are electrically connected, at least partly, in series.

The structure of the electrochemical cells and the general operation of the battery are identical to what was described in connection with FIG. 1: Each cell 300 comprises a chamber formed by a cathode compartment 310 containing the catholyte and an anode compartment 320 containing the anolyte. The cathode and anode compartments are separated by a separator 330 that is electrically insulating and permeable to the ions contained in the catholyte and the anolyte. The cathode 310 and anode 320 compartments each comprise an inlet duct (401, 501) and an outlet duct (404, 504) for the circulation respectively of the catholyte and of the anolyte in the compartments.

The battery 1000 also comprises a first storage tank 110 for the catholyte and a second storage tank 120 for the anolyte.

Preferably, a pump 610 enables the circulation of the catholyte between the tank 110 and the cathode compartments 310 of the cells 300, and a pump 620 enables the circulation of the anolyte between the tank 120 and the anode compartments 320 of the cells 300.

The circulation of the electrolytes is carried out by fluid communication between the first tank 110 and the cathode compartment 310 of each cell 300 and between the second tank 120 and the anode compartment 320 of each cell 300, such that the electrochemical cells are fluidically connected in parallel.

More particularly, a means for providing fluid communication comprises a first main inlet duct 400 and a first main outlet duct 410 connecting the first tank 110 to the cathode compartments 310 of the electrochemical cells 300, and also a second main inlet duct 500 and a second main outlet duct 510 connecting the second tank 120 to the anode compartments 320 of the cells 300.

The first main inlet duct 400 is configured to distribute the catholyte into the inlet ducts 401 of the cathode compartments 310 by use of the first pump 610 and the first main outlet duct 410 collects the catholyte from the outlet ducts 404 of the cathode compartments 310. Similarly, the second main inlet duct 500 distributes the anolyte into the inlet ducts 501 of the anode compartments 320 by use of the second pump 620 and the second main outlet duct 510 is configured to collect the anolyte from the outlet ducts 504 of the anode compartments 320.

Preferably, the inlet 401 and outlet 501 ducts of the cathode 310 and anode 320 compartments of the electrochemical cells 300 are electrically insulating. Likewise for the first main inlet duct 400, the second main inlet duct 500, and also for the first main outlet duct 410 and the second main outlet duct 510, which are electrically insulating.

Advantageously, the inlet 401 and outlet 501 ducts of the cathode 310 and anode 320 compartments of the cells, and the first and second main inlet and outlet ducts (400, 500, 410, 510), comprises one or more electrically insulating materials, preferably selected from thermoplastic polymers such as poly(vinyl chloride) (PVC), polyethylene (PE) and polypropylene (PP), and more preferentially selected from PVC, PE and PP.

Alternatively, the inlet 401 and outlet 501 ducts of the cathode 310 and anode 320 compartments of the cells, and the first and second main inlet and outlet ducts (400, 500, 410, 510), comprise:
- a body including one or more electrically conductive materials;
- an electrically insulating internal coating which contacts the catholyte or the anolyte. The internal coating may be an electrically insulating material, for instance an electrically insulating fluoropolymer such as polytetrafluoroethylene (PTFE) or perfluoroalkoxy (PFA), and preferably selected from PTFE and PFA.

According to the invention, the shunt currents are reduced, or even eliminated, by the system formed by the combination of the elements 700 and 800. The system for reducing shunt currents comprises:
- means 700 for injecting a gas into the inlet (401, 501) and outlet (404, 504) ducts of the cathode 310 and anode 320 compartments of (n−1) electrochemical cells in order to form gas bubbles in the inlet (401, 501) and outlet (404, 504) ducts;

a device 800 for removing the gas bubbles which is positioned on the inlet ducts (401, 501) of the cathode 310 and anode 320 compartments of the (n−1) electrochemical cells, which is positioned downstream from the means 700 for injecting the gas and upstream of the cathode 310 and anode 320 compartments, of the inlet (310*a*, 320*a*) of the cathode and anode compartments.

If the battery has two cells 300 as represented in FIG. 2, the system for reducing the shunt currents may comprise only a single set of means 700 for injecting a gas and device 800 for removing the gas bubbles placed on the flow pathways of the electrolytes of a single cell in order to reduce the shunt currents. This configuration can be generalized to a battery comprising n cells, which may only comprise means 700 for injecting a gas and devices 800 for removing the gas bubbles in relation to (n−1) cells. In FIG. 2, the means for injecting a gas and the device for removing the gas bubbles are provided for each cell of the battery.

According to the invention, gas is injected into the inlet and outlet ducts of the cathode and anode compartments to create gas bubbles in the inlet and outlet ducts. In this way, a discontinuity of the liquid flow is created, which "breaks" the electric pathway in the electrolyte, and makes it possible to reduce or even eliminate the shunt currents.

Preferably, the gas used is an inert gas, for example $N_2$, in order to prevent any reaction with the reactants contained in the electrolyte.

Advantageously, the largest dimension of the gas bubbles is greater than or equal to 1.5 times the diameter of the inlet and outlet ducts of the cathode and anode compartments of said (n−1) electrochemical cells, in order to optimize the electrical insulation of the electrolyte.

Figure 3:
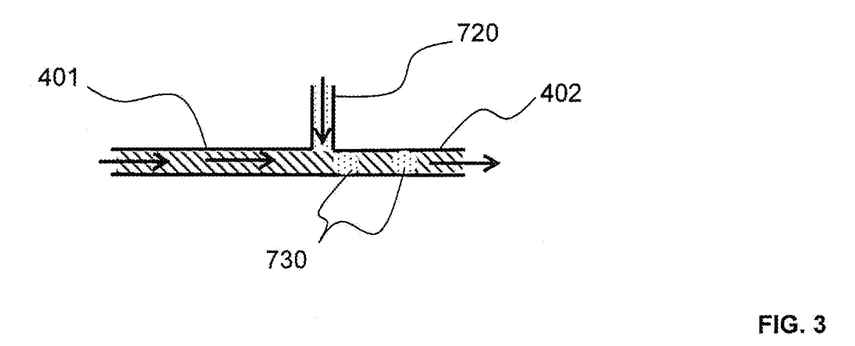
FIG. 3 is a diagram along a cross section of the gas injection means for forming gas bubbles in a redox flow battery according to the invention.

FIG. 3 illustrates an injector for injecting gas into an inlet duct 401 of a cell 300 in which the catholyte flows. The injection is carried out in the same way and with the same means in the inlet circuit 501 transporting the anolyte to the cell, and in the outlet ducts 404 and 504 of the cathode and anode compartments of the cells 300.

The gas injector comprises a gas supply pipe 720 connected to a tank of the gas (not represented), which opens into the inlet duct 401 of the cathode compartment. The gas injected generates bubbles 730 which are transported with the catholyte to the cathode compartment through a first portion 402 of the inlet duct.

Preferably, the means for injecting the gas comprises at least one fan or a gas compressor connected to the tank of the gas in order to keep the tank under pressure.

More preferentially, the means for injecting the gas comprises a single gas pump, connected to injectors as represented in FIG. 3, in order to inject gas into the various inlet and outlet ducts of the cathode and anode compartments of the cells.

The gas supply may be controlled by a valve positioned on the gas supply pipe 720, downstream of the gas tank. The means for injecting the gas may thus comprise at least one valve, and preferably as many valves as gas supply pipes 720.

Alternatively, the gas supply pipe has a flow area such that the gas is injected into the inlet duct 401 of the cathode compartment by the Venturi effect.

By way of example, a simulation of an electrolyte flow of a redox flow battery was carried out on COMSOL Multiphysics® Modeling software, in order to show the electrical insulation obtained by the presence of gas bubbles in a duct containing a conductive electrolyte. The modeling relates to a duct with a diameter of 5 mm and a length of 100 mm containing an electrolyte having an ionic conductivity comparable to that of a conventional redox flow battery, i.e. 10 S/m. Between the two ends of the duct, a current of 1 $A/m^2$ is applied. The voltage difference between the ends of the duct containing an electrolyte without gas bubbles is very low, of the order of 10 mV, indicating a low resistance, and therefore the possibility of creating a sizeable shunt current in a redox flow battery. On the contrary, the voltage difference between the ends of the duct containing an electrolyte comprising a 6-mm long $N_2$ bubble is equal to 816 V, implying a significant electrical insulation of the ends of the duct by the gas bubble.

The gas bubbles are removed before the electrolyte (the catholyte and the anolyte) enters the cathode 310 and anode 320 compartments of the cells 300. Thus, a maximum exchange area between the reactants of the electrolyte and the electrodes is conserved. For this, the device 800 for removing the gas bubbles is positioned downstream of the injector for injecting gas into the inlet ducts (401, 501), and upstream of the inlet (310*a*, 320*a*) of the cathode and anode compartments.

In the present description, reference is made to positions upstream and downstream in relation to the flow direction of a fluid, typically the electrolyte (and optionally the gas if appropriate).

Figure 4:
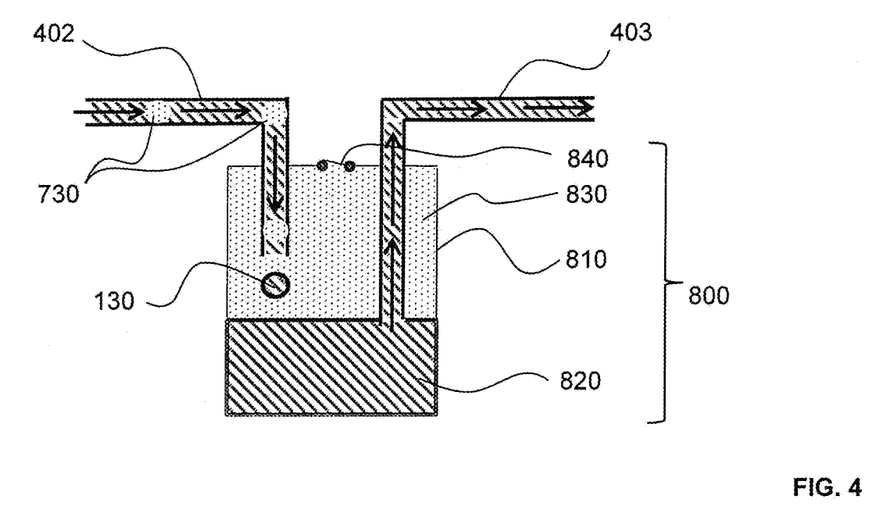
FIG. 4 is a diagram along a cross section of the device for removing the gas bubbles in a redox flow battery according to the invention.

An example of a device for removing the gas bubbles is illustrated in FIG. 4. The device 800 operates as a separator of the liquid (i.e. electrolyte) and gas (the gas injected for forming bubbles) phases. Devices for removing bubbles other than the one represented may be used in the device for reducing shunt currents of the battery according to the invention, such as a trap similar to a vapor trap for separating the liquid condensates from the gas, but in the reverse direction for separating the added gas from the liquid.

The device 800 for removing the gas bubbles comprises a hermetic chamber 810 comprising:

a liquid phase in a lower part 820 of the chamber 810, comprising catholyte or anolyte, depending on whether the device is on the supply line of the electrolyte of the cathode or anode compartment;

a gas phase in an upper part 830 of the chamber 810, comprising gas of the same type as the gas injected to form the bubbles;

an outlet 840 for the gas, which preferably is a relief valve, positioned at the top of the upper part 830 of the chamber 810.

The first portion 402 of the inlet duct, in which the anolyte or catholyte with the gas added flows, opens into the upper part 830 of the chamber 810, and a second portion 403 of the inlet duct, in which the anolyte or catholyte with the gas removed flows, opens into the lower part 820 of the chamber 810.

The first portion 402 of the inlet duct is located downstream of the means 700 for injecting the gas into the inlet ducts 401 of the cathode 310 or anode 320 compartments of the (n−1) electrochemical cells.

The second portion 403 of the inlet duct is located downstream of the device 800 for removing the gas and upstream of the cathode 310 or anode 320 compartments of the (n−1) electrochemical cells.

The inlet ducts (401, 501) of the cathode and anode compartments of the cells are thus interrupted, and formed by the first portion 402 which opens into the upper part of the chamber of the device 800, and by the second portion 403 which draws the electrolyte from the bottom 820 of the chamber of the device 800, to open into the inlet of the cathode 310 or anode 320 compartment of the cell 300.

The electrolyte containing the gas bubbles pours into the upper part 830 of the chamber 810 containing gas. The gas from the bubbles is thus released in the gas phase of the chamber 810, and the liquid electrolyte flows into and accumulates in the lower part 820 of the chamber. A liquid guard is present in this lower part of the chamber, in particular so as to prevent any undesired entrainment of the gas with the liquid at the outlet of the device 800. The second portion 403 of the inlet duct is open in the lower part 820 of the chamber containing electrolyte, hence the electrolyte is pumped in order to be transported, without gas bubbles, to the cathode 310 or anode 320 compartment of the cell 300. The pressure difference generated by the electrolyte pumps 610 and 620 may provide the energy needed for the displacement to this suction of the liquid in the device 800.

The gas phase is discharged by the relief valve 840, which may be controlled by an external control device, or which may be controlled mechanically by a control device inside the chamber, for example by means of a float.

If the flow rate is low, the electrolyte flows drop by drop, as shown in FIG. 4 where a drop of electrolyte 130 is represented, creating additional electrical insulation in the electrolyte.

In the battery according to the invention, the catholyte and anolyte containing gas bubbles on leaving the cathode and anode compartments of the cells are sent back to the respective tanks 110 and 120 in which the separation of the gas and liquid is carried out.

Figure 5:
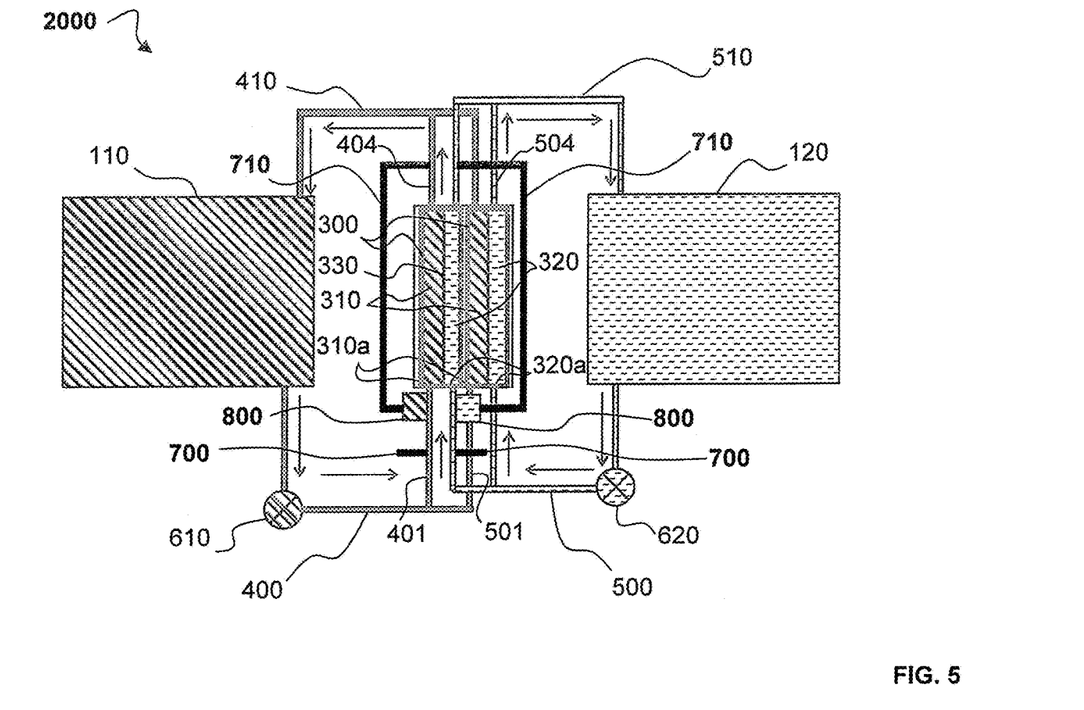
FIG. 5 is a schematic cross-sectional view of a redox flow battery according to a second embodiment of the invention.

FIG. 5 illustrates a redox flow system for storing and releasing electrochemical energy 2000 according to a second embodiment of the invention.

The system 2000 and the operation thereof are identical in every respect to the system 1000, except for the system for reducing shunt currents, in particular the device 800 for removing gas bubbles and the means for injecting gas into the outlet ducts of the cathode and anode compartments of (n−1) electrochemical cells.

In the battery 2000, the means for injecting the gas comprises a circuit 710 for recycling the gas removed by the device 800 for removing the gas bubbles with the gas being reinjected into the outlet ducts 404 and 504 of the cathode 310 or anode 320 compartments of the (n−1) electrochemical cells. According to this embodiment, the recycling circuit 710 is connected to the outlet 840 of the gas from the chamber 810 of the device 800, and to a supply pipe 720 for supplying the gas to the outlet duct 404 or 504.

The recycling circuit may comprise means for forced circulation of gas, for example a gas pump. The supply of the gas may be controlled by a valve positioned on the gas supply pipe 720, or may be left free with the amount of gas introduced being the same as that removed via the outlet 840. Alternatively, the gas supply pipe has a flow area such that the gas is injected into the outlet duct (404, 504) of the cathode 310 or anode 320 compartment by the Venturi effect, in particular when the flow rate of liquid is sufficient to enable such an effect.

The invention claimed is:

1. A redox flow system for storing and releasing electrochemical energy, comprising:
    n electrochemical cells electrically connected in series with n being an integer greater than 1, each cell comprising a chamber having a cathode compartment containing a catholyte and an anode compartment containing an anolyte, the cathode and anode compartments being separated by a separator that is electrically insulating and permeable to ions contained in the catholyte and the anolyte, and the cathode and anode compartments each comprising an inlet duct and an outlet duct for the circulation respectively of the catholyte and of the anolyte in the compartments;
    a first storage tank for the catholyte;
    a second storage tank for the anolyte;
    means providing fluid communication between the first tank and the cathode compartment of each electrochemical cell and between the second tank and the anode compartment of each electrochemical cell so that the n electrochemical cells which are connected fluidically in parallel; and
    a system for reducing shunt currents including means for injecting a gas into the inlet and outlet ducts of the cathode and anode compartments of (n−1) electrochemical cells to form gas bubbles in the inlet and outlet ducts; and a device for removing the gas bubbles positioned in inlet ducts of the cathode and anode compartments of the (n−1) electrochemical cells, which is positioned downstream of the means for injecting a gas and upstream of cathode and anode compartments of the (n−1) electrochemical cells.

2. The system as claimed in claim 1, wherein the gas is $N_2$.

3. The system as claimed in claim 1, wherein a largest dimension of the gas bubbles is greater at least 1.5 times a diameter of the inlet and outlet ducts of the cathode and anode compartments of the (n−1) electrochemical cells.

4. The system as claimed in claim 2, wherein a largest dimension of the gas bubbles is greater at least 1.5 times a diameter of the inlet and outlet ducts of the cathode and anode compartments of the (n−1) electrochemical cells.

5. The system as claimed in claim 1, wherein the means for injecting the gas comprises in each inlet duct and outlet duct of the cathode and anode compartments of the (n−1) electrochemical cells a gas supply pipe connected to a tank of the gas which opens into the inlet duct or outlet duct of the cathode and anode compartments.

6. The system as claimed in claim 2, wherein the means for injecting the gas comprises in each inlet duct and outlet duct of the cathode and anode compartments of the (n−1) electrochemical cells a gas supply pipe connected to a tank of the gas which opens into the inlet duct or outlet duct of the cathode and anode compartments.

7. The system as claimed in claim 3, wherein the means for injecting the gas comprises in each inlet duct and outlet duct of the cathode and anode compartments of the (n−1) electrochemical cells a gas supply pipe connected to a tank of the gas which opens into the inlet duct or outlet duct of the cathode and anode compartments.

8. The system as claimed in claim 5, wherein the means for injecting the gas comprises at least one of a fan or a gas compressor connected to the tank of the gas to provide pressure in the tank.

9. The system as claimed in claim 5, wherein the means for injecting the gas comprises at least one valve positioned on the gas supply pipe downstream from the gas tank.

10. The system as claimed in claim 8, wherein the means for injecting the gas comprises at least one valve positioned on the gas supply pipe downstream from the gas tank.

11. The system as claimed in claim 5, wherein the gas supply pipe has a flow area providing gas injection into the inlet ducts or outlet ducts of the cathode and anode compartments by a Venturi effect.

12. The system as claimed in claim 8, wherein the gas supply pipe has a flow area providing gas injection into the inlet ducts or outlet ducts of the cathode and anode compartments by a Venturi effect.

13. The system as claimed in claim 1, wherein the device for removing the gas bubbles comprises a hermetic chamber comprising:
- a liquid phase in a lower part of the chamber comprising the anolyte or the catholyte;
- a gas phase in an upper part of the chamber comprising gas of a same type as a gas injected to form the bubbles;
- an outlet for the gas, including a relief valve, positioned at a top of an upper part of the chamber;
- a first portion of the inlet duct in which the catholyte or anolyte flows with the gas and which opens into the upper part of the chamber; and
- a second portion of the inlet duct in which the catholyte or anolyte flows with the gas removed which opens into a lower part of the chamber; and wherein
- the first portion of the inlet duct is located downstream of the means for injecting the gas into the inlet ducts of the cathode or anode compartments of the (n−1) electrochemical cells and the second portion of the inlet duct is located downstream of the device for removing the gas and upstream of the cathode or anode compartments of the (n−1) electrochemical cells.

14. The system as claimed in claim 1, wherein the means for injecting a gas comprises a circuit for recycling the gas which is removed by the device for removing the gas bubbles, to the outlet ducts of the cathode or anode compartments of the (n−1) electrochemical cells.

15. The system as claimed in claim 1, wherein the means for fluid communication comprises:
- a first inlet duct and a first outlet duct connecting the first tank to the cathode compartments of the n electrochemical cells;
- the first inlet duct distributes the catholyte into the inlet ducts of the cathode compartments with a first pump and the first main outlet duct collects the catholyte from the outlet ducts of the cathode compartments;
- a second inlet duct and a second main outlet duct connects the second tank to the anode compartments of the n electrochemical cells; and
- the second main inlet duct distributes the anolyte into the inlet ducts of the anode compartments with a second pump and the second outlet duct collects the anolyte from the outlet ducts of the anode compartments of the n electrochemical cells.

16. The system as claimed in claim 15, wherein the inlet and outlet ducts of the cathode and anode compartments of the n electrochemical cells and the first and second inlet and outlet ducts are electrically insulating.

17. The system as claimed in claim 16, wherein the inlet and outlet ducts of the cathode and anode compartments of the n electrochemical cells and the first and second main inlet and outlet ducts comprise electrically insulating materials, selected from of PVC, polyethylene and polypropylene.

18. The system as claimed in claim 16, wherein the inlet and outlet ducts of the cathode and anode compartments of the n electrochemical cells and the first and second inlet and outlet ducts have a body comprising at least one electrically conductive material and have an electrically insulating internal coating in contact with the catholyte or the anolyte, and the internal coating comprises PTFE and PFA.

19. A process for reducing shunt currents in a redox flow system for storing and releasing electrochemical energy as claimed in claim 1, comprising steps of:
- sending a catholyte and an anolyte into cathode and anode compartments of n electrochemical cells electrically connected in series with n being an integer greater than 1, and fluidically connected in parallel by pumping the catholyte and anolyte respectively from a first tank and a second tank;
- injecting gas into the catholyte and anolyte inlet ducts of the cathode and anode compartments of (n−1) electrochemical cells to form gas bubbles in the inlet ducts;
- removing the gas bubbles from the catholyte and anolyte before entry into the cathode and anode compartments of (n−1) electrochemical cells;
- injecting gas into the catholyte and anolyte outlet ducts of the cathode and anode compartments of (n−1) electrochemical cells to form gas bubbles in the outlet ducts; and
- sending the catholyte and the anolyte containing gas bubbles respectively back to the first tank and the second tank with the gas being separated from the catholyte and from the anolyte within the first and second tanks.

* * * * *